(12) United States Patent
Akiyama et al.

(10) Patent No.: US 12,620,910 B2
(45) Date of Patent: May 5, 2026

(54) POWER CONVERSION DEVICE, RECORDING MEDIUM, AND CONTROL METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yukina Akiyama, Kawasaki (JP); Shunsuke Kawachi, Tokyo (JP); Yuki Kudo, Tokyo (JP); Yoko Sakauchi, Tokyo (JP); Koji Toba, Tokyo (JP); Kenji Mitsumoto, Tokyo (JP); Daisuke Takeda, Kawasaki (JP)

(73) Assignees: Kabushiki Kaisha Toshiba, Kawasaki (JP); Toshiba Energy Systems & Solutions Corporation, Kawasaki (JP)

( * ) Notice: Subject to any disclaimer, the term of this patent is extended or adjusted under 35 U.S.C. 154(b) by 197 days.

(21) Appl. No.: 18/719,431

(22) PCT Filed: Dec. 16, 2021

(86) PCT No.: PCT/JP2021/046412
§ 371 (c)(1),
(2) Date: Jun. 13, 2024

(87) PCT Pub. No.: WO2023/112234
PCT Pub. Date: Jun. 22, 2023

(65) Prior Publication Data
US 2025/0070687 A1     Feb. 27, 2025

(51) Int. Cl.
H02M 7/48       (2007.01)
H02J 3/00       (2006.01)
H02M 7/537      (2006.01)

(52) U.S. Cl.
CPC ............... H02M 7/537 (2013.01); H02J 3/00 (2013.01)

(58) Field of Classification Search
CPC ............ H02M 7/48; H02M 7/537; H02J 3/00
See application file for complete search history.

(56) References Cited

U.S. PATENT DOCUMENTS

2017/0047861 A1     2/2017   Sakimoto et al.
2020/0116127 A1     4/2020   Brombach et al.
(Continued)

FOREIGN PATENT DOCUMENTS

JP         H6-86560 A       3/1994
JP       2015-211617 A     11/2015
(Continued)

*Primary Examiner* — Adolf D Berhane
(74) *Attorney, Agent, or Firm* — Finnegan, Henderson, Farabow, Garrett & Dunner, LLP

(57)                ABSTRACT

A power conversion device is disclosed in which a grid following amplitude command value and a grid following phase command value are output in response to receiving a switching signal instructing switching from grid following control to grid forming control. The grid following amplitude command value indicates a target value of an amplitude computed by the grid following control. The grid following phase command value indicates a target value of a phase computed by the grid following control. When the grid following control is switched to the grid forming control, an initial value of the target value of the amplitude in the grid forming control to be the grid following amplitude command value is set, and an initial value of the target value of the phase in the grid forming control to be the grid following phase command value is set.

12 Claims, 4 Drawing Sheets

(56) References Cited

U.S. PATENT DOCUMENTS

| 2025/0047214 A1* | 2/2025 | Akiyama | H02M 7/537 |
|---|---|---|---|
| 2025/0070555 A1* | 2/2025 | Akiyama | H02M 7/48 |
| 2025/0373178 A1* | 12/2025 | Uemura | H02M 1/32 |

FOREIGN PATENT DOCUMENTS

| JP | 2020-524970 A | 8/2020 |
|---|---|---|
| WO | WO 2015/070493 A1 | 5/2015 |

* cited by examiner

SWITCHING SIGNAL

POWER CONVERSION DEVICE, RECORDING MEDIUM, AND CONTROL METHOD

CROSS-REFERENCE TO RELATED APPLICATIONS

This application is national stage application of International Application No. PCT/JP2021/046412, filed on Dec. 16, 2021, which designates the United States, incorporated herein by reference.

FIELD

Embodiments described herein relate generally to a power conversion device, a recording medium, and a control method.

BACKGROUND

In recent years, utilization of an inverter power supply is developed. The inverter power supply converts DC power output from power supplies such as generators utilizing renewable energy and storage batteries into AC power and outputs the AC power. As a control system for inverter power supplies, a grid forming (GFM) type and a grid following (GFL) type have been known. Control of the GFM type (hereinafter referred to as GFM control) is control for maintaining an amplitude and a phase of an output voltage of an inverter power supply at given set values. Control of the GFL type (hereinafter referred to as GFL control) is control for causing the amplitude and the phase of the output voltage of the inverter power supply to follow an amplitude and a phase of a voltage of a given power grid. The GFM control and the GFL control described above may be switched in accordance with use situations and the like of the inverter power supply.

DETAILED DESCRIPTION

A power conversion device of an embodiment includes a conversion circuit, a grid forming control circuit, a grid following control circuit, a modulation circuit, a switching circuit, a command value output circuit, and an initial value adjusting circuit. The conversion circuit is configured to convert DC power output from a power supply into AC power and output the AC power. The grid forming control circuit is configured to generate a first modulation command to change an amplitude and a phase of an output voltage from the conversion circuit by grid forming control for maintaining the amplitude and the phase of the output voltage at given set values. The grid following control circuit is configured to generate a second modulation command to change the amplitude and the phase of the output voltage by grid following control for causing the amplitude and the phase of the output voltage to follow an amplitude and a phase of a grid voltage as a voltage of a given power grid. The modulation circuit is configured to change the amplitude and the phase of the output voltage on the basis of the first modulation command or the second modulation command. The switching circuit is configured to switch, in accordance with a switching signal, input to the modulation circuit such that either the first modulation command or the second modulation command is input to the modulation circuit. The command value output circuit is configured to output a grid following amplitude command value and a grid following phase command value in response to receiving the switching signal instructing switching from the grid following control to the grid forming control. The grid following amplitude command value indicates a target value of an amplitude computed by the grid following control. The grid following phase command value indicates a target value of a phase computed by the grid following control. The initial value adjusting circuit is configured to, when the grid following control is switched to the grid forming control, set an initial value of the target value of the amplitude in the grid forming control to be the grid following amplitude command value, and set an initial value of the target value of the phase in the grid forming control to be the grid following phase command value.

The following describes an embodiment with reference to the accompanying drawings.

Figure 1:
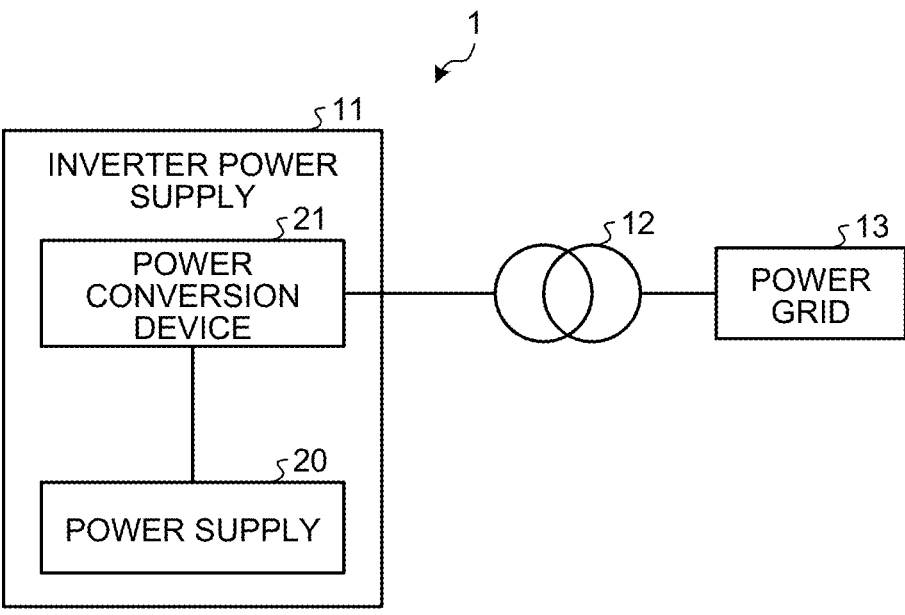
FIG. 1 is a block diagram of an example of a configuration of a power system of an embodiment.

FIG. 1 is a block diagram of an example of a configuration of a power system 1 of the embodiment. The power system 1 includes an inverter power supply 11, a transformer 12, and a power grid 13. The power system 1 can be, for example, a so-called microgrid system that constitutes the self-contained power grid 13 utilizing a distributed power supply including power supplies such as the inverter power supply 11.

The inverter power supply 11 includes a power supply 20 and a power conversion device 21. The power supply 20 is a unit for outputting DC power and can be, for example, a generator utilizing renewable energy (for example, sunlight, wind power, or the like), a storage battery, or the like. The power conversion device 21 is a device converting the DC power output from the power supply 20 into AC power and outputting the AC power. Note that a plurality of power supplies 20 may be connected to one power conversion device 21.

The power conversion device 21 of the present embodiment includes a function of executing, in a switchable manner as appropriate, grid forming control (GFM control) for maintaining an amplitude and a phase of an output voltage at given set values, and grid following control (GFL control) for causing the amplitude and the phase of the output voltage to follow an amplitude and a phase of a voltage of the power grid 13.

The AC power output from the inverter power supply 11 (the power conversion device 21) is boosted by the transformer 12, and is then output to the power grid 13. Note that the transformer 12 may be unnecessary depending on the characteristics of the inverter power supply 11 and the power grid 13.

Figure 2:
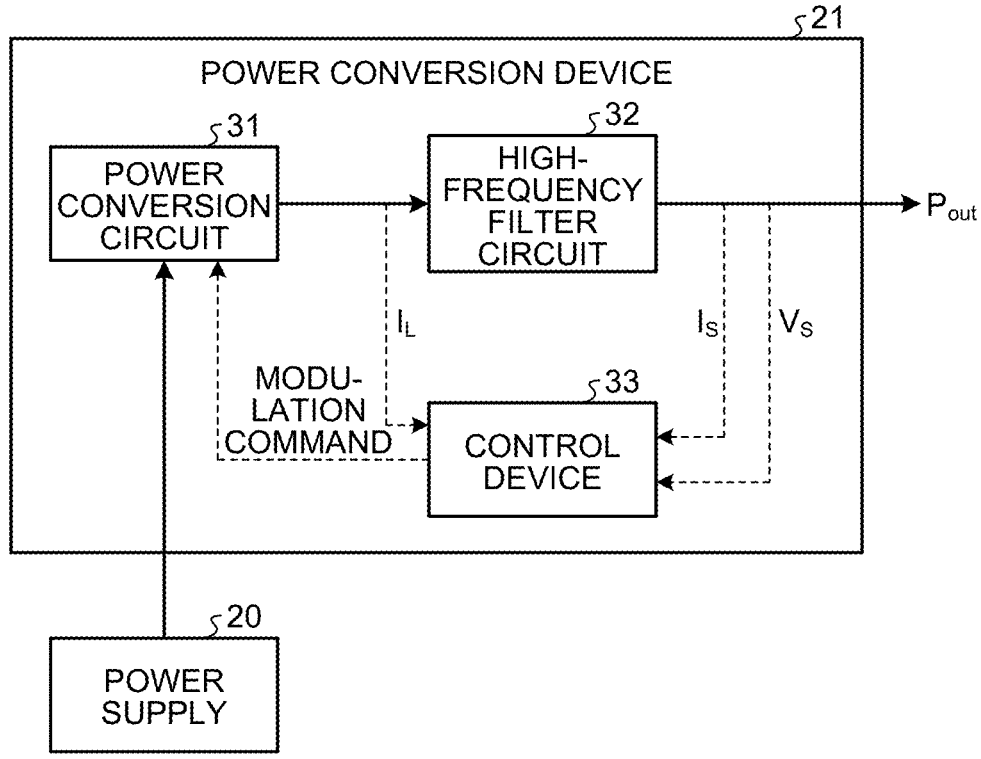
FIG. 2 is a block diagram of an example of a hardware configuration of a power conversion device of the embodiment.

FIG. 2 is a block diagram of an example of a hardware configuration of the power conversion device 21 of the embodiment. The exemplified power conversion device 21 includes a power conversion circuit 31, a high-frequency filter circuit 32, and a control device 33 (an example of an information processing apparatus).

The power conversion circuit 31 is a circuit that converts the DC power output from the power supply 20 into the AC power. The power conversion circuit 31 can be constituted by utilizing, for example, a converter circuit, a pulse width modulation (PWM) circuit, or the like. The high-frequency filter circuit 32 is a circuit (for example, a reactor) that performs high-frequency filter (low-pass) processing on the output of the power conversion circuit 31. The control device 33 is an integrated circuit including a central processing unit (CPU), a memory, and the like. The control device 33 executes computing processing and control processing in accordance with a computer program stored in the memory. The control device 33 may be configured utilizing an application specific integrated circuit (ASIC), a field programmable gate array (FPGA), or the like.

The power conversion circuit 31 changes the amplitude and the phase of the output voltage on the basis of a modulation command output from the control device 33. The control device 33 performs the GFM control or the GFL control on the basis of a feedback signal of the output from the power conversion circuit 31 to generate a modulation command to change the amplitude and the phase of output power Pout (an output voltage VS) from the power conversion device 21. In the configuration exemplified herein, the control device 33 calculates active power and reactive power on the basis of a reactor current IL flowing through the high-frequency filter circuit 32, an output current IS from the high-frequency filter circuit 32, the output voltage VS from the high-frequency filter circuit 32, etc.

The control device 33 of the present embodiment has a function of switching between the GFM control and the GFL control in accordance with a given condition, a function of improving stability at the time of switching from the GFL control to the GFM control (for example, a reduction in sudden fluctuations in the output voltage VS or the like), etc.

Figure 3:
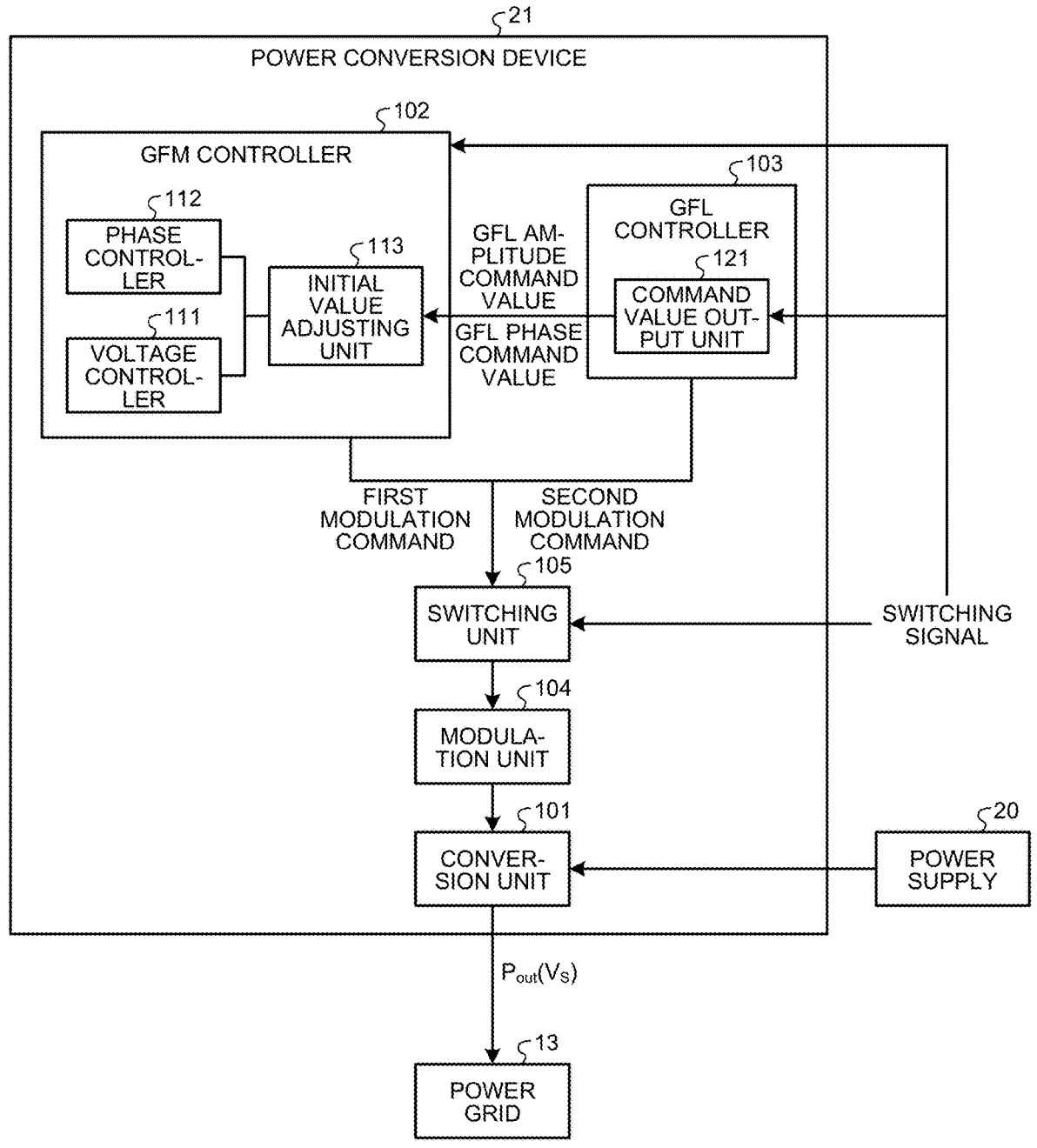
FIG. 3 is a block diagram of an example of a functional configuration of the power conversion device of the embodiment.

FIG. 3 is a block diagram of an example of a functional configuration of the power conversion device 21 of the embodiment. The power conversion device 21 of the present embodiment includes a conversion unit 101, a GFM controller 102 (a grid forming control unit), a GFL controller 103 (a grid following control unit), a modulation unit 104, and a switching unit 105. These functional elements 101 to 105 can be configured by, for example, cooperation of hardware elements exemplified in FIG. 2 and software elements such as a computer program controlling the control device 33.

The conversion unit 101 outputs the output power (active output power) Pout obtained by converting the DC power output from the power supply 20 into the AC power. In this process, the amplitude and the phase of the output voltage VS from the conversion unit 101 are adjusted by the modulation unit 104.

The GFM controller 102 executes the GFM control for maintaining the amplitude and the phase of the output voltage VS at given set values to generate a first modulation command to change the amplitude and the phase of the output voltage VS by the GFM control. The GFL controller 103 executes the GFL control for causing the amplitude and the phase of the output voltage VS to follow an amplitude and a phase of a voltage (a grid voltage) of a predetermined power grid (for example, the power grid 13) to generate a second modulation command to change the amplitude and the phase of the output voltage VS by the GFL control.

The switching unit 105 switches input to the modulation unit 104 such that either the first modulation command or the second modulation command is input to the modulation unit 104 in accordance with a switching signal output from a given control mechanism. The modulation unit 104 changes the amplitude and the phase of the output voltage VS on the basis of the first modulation command or the second modulation command.

The GFM controller 102 of the present embodiment includes a voltage controller 111, a phase controller 112, and an initial value adjusting unit 113. The GFL controller 103 of the present embodiment includes a command value output unit 121.

The voltage controller 111 generates an amplitude command indicating a target value of the amplitude of the output voltage VS computed by the GFM control. The phase controller 112 generates a phase command indicating a target value of the phase of the output voltage VS computed by the GFM control. The first modulation command is generated on the basis of the amplitude command generated by the voltage controller 111 and the phase command generated by the phase controller 112.

When a switching signal instructing switching from the GFL control to the GFM control is received, the command value output unit 121 outputs a GFL amplitude command value (a grid following amplitude command value) indicating a target value of an amplitude computed by the GFL control, and a GFL phase command value (a grid following phase command value) indicating a target value of a phase computed by the GFL control to the initial value adjusting unit 113.

When the GFL control is switched to the GFM control, the initial value adjusting unit 113 sets an initial value of the target value of the amplitude in the GFM control (the amplitude command) to be the GFL amplitude command value, and sets an initial value of the target value of the phase in the GFM control (the phase command value) to be the GFL phase command value.

Figure 4:
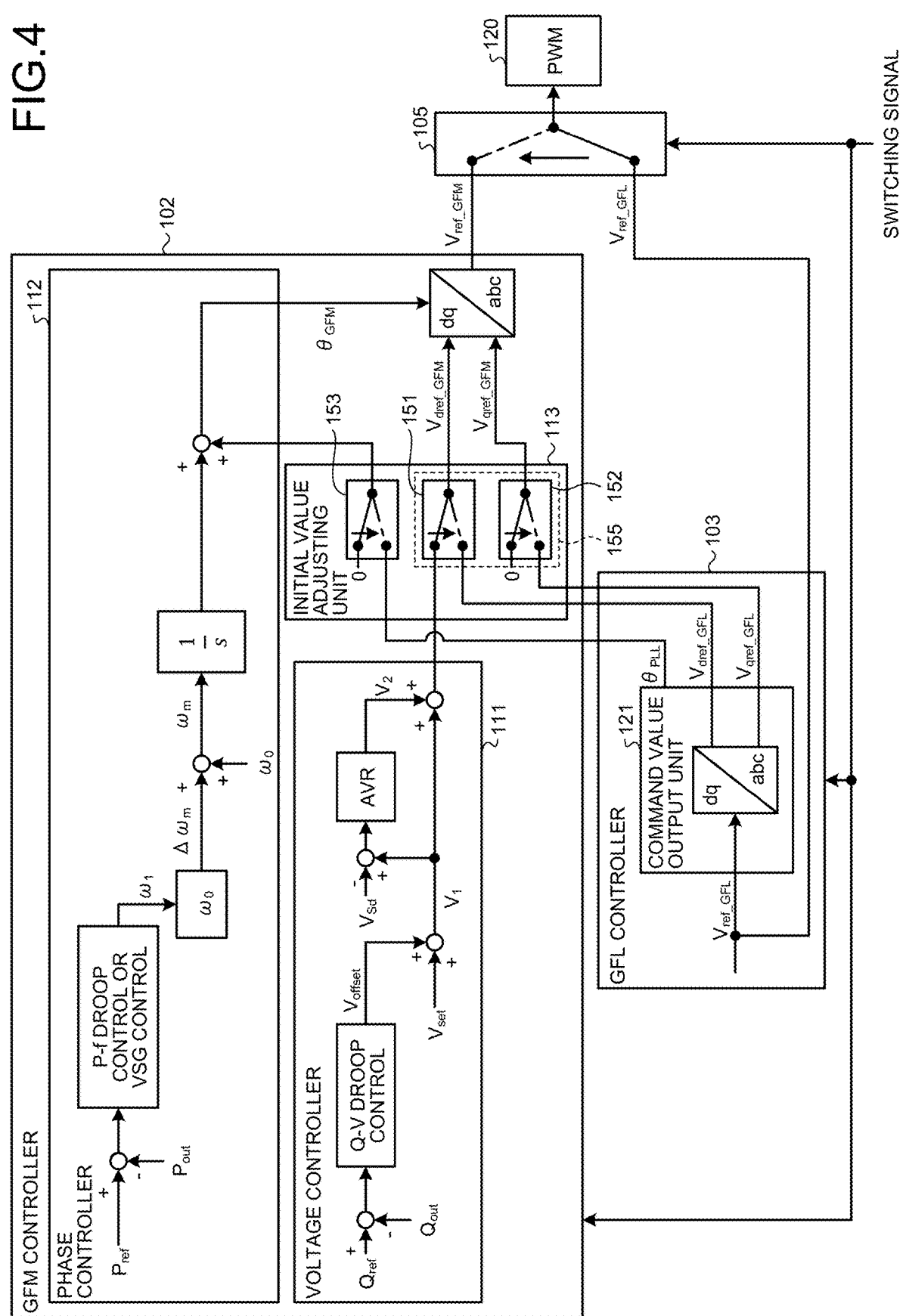
FIG. 4 is a control block diagram of an example of processing in a GFM controller and GFL controller of the embodiment.

FIG. 4 is a control block diagram of an example of processing in the GFM controller 102 and the GFL controller 103 of the embodiment. In the voltage controller 111, an amplitude command offset value Voffset is computed by Q-V droop control on a value obtained by subtracting a reactive power output value Qout from a reactive power command value Qref. A first amplitude set value V1 is computed by adding a reference amplitude set value Vset and the amplitude command offset value Voffset. A second amplitude set value V2 is computed by automatic voltage regulator (AVR) on a value obtained by subtracting a d-axis grid amplitude Vsd from the first amplitude set value V1. An inverter output d-axis amplitude command value Vdref_GFM (an example of the target value of the amplitude in the GFM control) as a d-axis amplitude command is computed by adding the first amplitude set value V1 and the second amplitude set value V2. An inverter output q-axis amplitude command value Vqref_GFM (an example of the target value of the amplitude in the GFM control) as a q-axis amplitude command is 0 during a normal state (for example, when the GFM control is executed on a given stable state).

In the phase controller 112, a frequency ω1 is computed by P-f droop control or virtual synchronous generator (VSG) control on a value obtained by subtracting the active power output value Pout from an active power command value Pref. A deviation Δωm between a frequency ω1 and a reference frequency ω0 of an inverter output voltage frequency is computed. An inverter output voltage phase θGFM (an example of the target value of the phase in the GFM control) is computed by integrating an inverter output voltage frequency ωm obtained by adding the deviation Δωm and the reference frequency ω0 with a transfer function 1/s of an integral element. In this process, s is a Laplace operator.

An inverter output voltage command value Vref_GFM as the first modulation command is generated on the basis of the inverter output d-axis amplitude command value Vdref_GFM, the inverter output q-axis amplitude command value Vqref_GFM, and the inverter output voltage phase θGFM. The GFL controller 103 generates an inverter output voltage command value Vref_GFL as the second modulation command by predetermined GFL control utilizing phase locked loop (PLL) or the like. The switching unit 105 switches input to a PWM 120 modulating the output voltage VS on the basis of the switching signal such that either the inverter output voltage command value Vref_GFM or the inverter output voltage command value Vref_GFL is input.

When the switching signal instructing switching from the GFL control to the GFM control is received, the command value output unit 121 outputs a PLL phase θPLL as the GFL phase command value, and the inverter output d-axis amplitude command value Vdref_GFL and the inverter output q-axis amplitude command value Vqref_GFL as the GFL amplitude command value to the initial value adjusting unit 113. The PLL phase θPLL can be obtained from, for example, the output of a PLL circuit or the like. The inverter output d-axis amplitude command value Vdref_GFL and the inverter output q-axis amplitude command value Vqref_GFL can be obtained by, for example, dq conversion using the PLL phase θPLL for the inverter output voltage command value Vref_GFL or the like.

As illustrated in FIG. 4, the initial value adjusting unit 113 includes a switch unit 151 corresponding to the inverter output d-axis amplitude command value Vdref_GFM, a switch unit 152 corresponding to the inverter output q-axis amplitude command value Vqref_GFM, and a switch unit 153 corresponding to the inverter output voltage phase θGFM. When the GFL control is switched to the GFM control, each of the switch units 151 to 153 becomes the state indicated by a single-dotted line from the state indicated by a solid line. Therefore, when the GFL control is switched to the GFM control, the PLL phase θPLL is set as an initial value of the inverter output voltage phase θGFM, the inverter output d-axis amplitude command value Vdref_GFL is set as an initial value of the inverter output d-axis amplitude command value Vdref_GFM, and the inverter output q-axis amplitude command value Vqref_GFL is set as an initial value of the inverter output q-axis amplitude command value Vqref_GFM.

With the above-described configuration, when the GFL control is switched to the GFM control, the GFM control is started with the amplitude command value and the phase command value in the GFL control as initial values. This can reduce sudden fluctuations in the output voltage at the time of starting of the GFM control.

In the present embodiment, a filter unit 155 is provided, which performs filter processing on the inverter output d-axis amplitude command value Vdref_GFL and the inverter output q-axis amplitude command value Vqref_GFL output from the command value output unit 121. The filter unit 155 can be, for example, a first-order delay filter, a rate limiter, or the like. This can reduce sudden fluctuations in the target value of the amplitude after switching to the GFM control.

Figure 5:
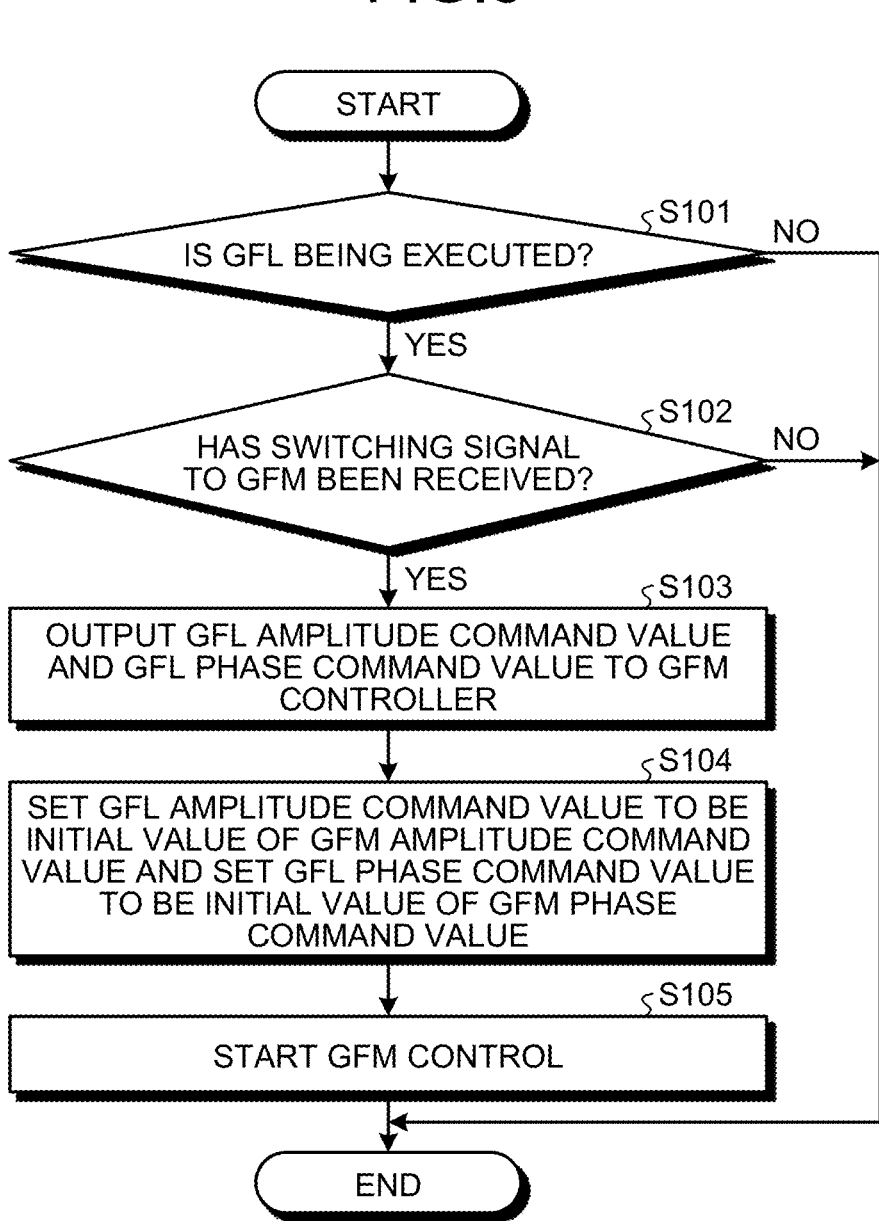
FIG. 5 is a flowchart of an example of processing at the time of switching from GFL control to GFM control by the power conversion device of the embodiment.

FIG. 5 is a flowchart of an example of processing at the time of switching from the GFL control to the GFM control by the power conversion device 21 of the embodiment. The initial value adjusting unit 113 determines whether the GFL control is being executed (whether the second modulation command has been input to the modulation unit 104) (S101), and, if the GFL control is not being executed (No at S101), ends the present routine. When the GFL control is being executed (Yes at S101), the initial value adjusting unit 113 determines whether the switching signal switching to the GFM control has been received (S102), and, if the switching signal to the GFM control has not been received (No at S102), ends the present routine.

If the switching signal to the GFM control has been received (Yes at S102), the command value output unit 121 outputs the GFL amplitude command value (the inverter output d-axis amplitude command value Vdref_GFL and the inverter output q-axis amplitude command value Vqref_GFL) and the GFL phase command value (the inverter output voltage phase θGFL) to the initial value adjusting unit 113 of the GFM controller 102 (S103). The initial value adjusting unit 113 sets the acquired GFL amplitude command value to be the initial value of the GFM amplitude command value (the inverter output d-axis amplitude command value Vdref_GFM and the inverter output q-axis amplitude command value Vqref_GFM) and sets the acquired GFL phase command value to be the initial value of the GFM phase command value (the inverter output voltage phase θGFM) (S104). Then, the voltage controller 111 and the phase controller 112 of the GFM controller 102 start the GFM control on the basis of the initial values set as described above (S105).

According to the above-described embodiment, when the GFL control is switched to the GFM control, the GFM control is started with the amplitude command value and the phase command value in the GFL control as initial values. This can reduce sudden fluctuations in the output voltage at the time of starting of the GFM control and improve the stability of the operation of the inverter power supply at the time of switching of the control system.

A computer program for implementing the function of the power conversion device 21 of the embodiment described above is mainly provided embedded in advance in a storage device included in the power conversion device 21, but is not limited to this. The computer program may be recorded and provided in a computer-readable recording medium such as a compact disc read only memory (CD-ROM), a flexible disk (FD), a compact disc recordable (CD-R), and a digital versatile disc (DVD), as an installable or executable file. The recording medium is not limited to a medium independent of a computer or incorporated system, but includes a recording medium in which a computer program transmitted via a local area network (LAN), the Internet, or the like is downloaded and stored or temporarily stored.

The computer program may be stored in a computer connected to a network such as the Internet and be provided by being downloaded via the network or provided or distributed via a network such as the Internet.

The above has described some embodiments of the present invention. These embodiments have been presented by way of example and do not intend to limit the scope of the invention. These novel embodiments can be performed in other various ways, and various omissions, replacements, and modifications can be made without departing from the gist of the invention. These embodiments and modifications thereof are included in the scope and the gist of the invention and are also included in the inventions described in the claims and the scope of equivalence thereof.

REFERENCE SIGNS LIST

1: power system, 11: inverter power supply, 12: transformer, 13: power grid, 20: power supply, 21: power conversion device, 31: power conversion circuit, 32: high-frequency filter circuit, 33: control device, 101: conversion unit, 102: GFM controller, 103: GFL controller, 104: modulation unit, 105: switching unit, 111: voltage controller, 112: phase controller, 113: initial value adjusting unit, 120: PWM, 121, command value output unit, 151; 152; 153: switch units, 155: filter unit

The invention claimed is:

1. A power conversion device comprising:

a conversion circuit configured to convert DC power output from a power supply into AC power and output the AC power;

a grid forming control circuit configured to generate a first modulation command to change an amplitude and a phase of an output voltage from the conversion circuit by grid forming control for maintaining the amplitude and the phase of the output voltage at given set values;

a grid following control circuit configured to generate a second modulation command to change the amplitude and the phase of the output voltage by grid following control for causing the amplitude and the phase of the output voltage to follow an amplitude and a phase of a grid voltage as a voltage of a given power grid;

a modulation circuit configured to change the amplitude and the phase of the output voltage on the basis of the first modulation command or the second modulation command;

a switching circuit configured to switch, in accordance with a switching signal, input to the modulation circuit such that either the first modulation command or the second modulation command is input to the modulation circuit;

a command value output circuit configured to output a grid following amplitude command value and a grid following phase command value in response to receiving the switching signal instructing switching from the grid following control to the grid forming control, the grid following amplitude command value indicating a target value of an amplitude computed by the grid following control, the grid following phase command value indicating a target value of a phase computed by the grid following control; and an initial value adjusting circuit configured to, when the grid following control is switched to the grid forming control, set an initial value of the target value of the amplitude in the grid forming control to be the grid following amplitude command value, and set an initial value of the target value of the phase in the grid forming control to be the grid following phase command value.

2. The power conversion device according to claim 1, wherein the initial value adjusting circuit includes a filter circuit configured to perform predetermined filter processing on the grid following amplitude command value output from the command value output circuit.

3. The power conversion device according to claim 2, wherein the filter circuit is a circuit of a first-order delay filter.

4. The power conversion device according to claim 2, wherein the filter circuit is a circuit of a rate limiter.

5. A non-transitory computer-readable recording medium on which programmed instructions are recorded, the instructions causing a computer to execute processing, the computer including a conversion circuit serving to convert DC power output from a power supply into AC power and output the AC power, the processing to be executed by the computer comprising:

processing of generating a first modulation command to change an amplitude and a phase of an output voltage from the conversion circuit by grid forming control for maintaining the amplitude and the phase of the output voltage at given set values;

processing of generating a second modulation command to change the amplitude and the phase of the output voltage by grid following control for causing the amplitude and the phase of the output voltage to follow an amplitude and a phase of a grid voltage as a voltage of a given power grid;

processing of changing the amplitude and the phase of the output voltage on the basis of the first modulation command or the second modulation command;

processing of switching, in accordance with a switching signal, input to a modulation circuit serving to change the amplitude and the phase of the output voltage, the switching being performed such that either the first modulation command or the second modulation command is input to the modulation circuit;

processing of outputting a grid following amplitude command value and a grid following phase command value in response to receiving the switching signal instructing switching from the grid following control to the grid forming control, the grid following amplitude command value indicating a target value of an amplitude computed by the grid following control, the grid following phase command value indicating a target value of a phase computed by the grid following control; and initial value adjusting processing of, when the grid following control is switched to the grid forming control, setting an initial value of the target value of the amplitude in the grid forming control to be the grid following amplitude command value, and setting an initial value of the target value of the phase in the grid forming control to be the grid following phase command value.

6. The recording medium according to claim 5, wherein the initial value adjusting processing includes performing predetermined filter processing on the grid following amplitude command value.

7. The computer program according to claim 6, wherein the predetermined filter processing is processing serving as a first-order delay filter.

8. The computer program according to claim 6, wherein the predetermined filter processing is processing serving as a rate limiter.

9. A control method implemented by a device including a conversion circuit, a grid forming control circuit, a grid following control circuit, a modulation circuit, and a switching circuit, the conversion circuit serving to convert DC power output from a power supply into AC power and output the AC power, the grid forming control circuit serving to generate a first modulation command to change an amplitude and a phase of an output voltage from the conversion circuit by grid forming control for maintaining the amplitude and the phase of the output voltage at given set values, the grid following control circuit serving to generate a second modulation command to change the amplitude and the phase of the output voltage by grid following control for causing the amplitude and the phase of the output voltage to follow an amplitude and a phase of a grid voltage as a voltage of a given power grid, the modulation circuit serving to change the amplitude and the phase of the output voltage on the basis of the first modulation command or the second modulation command, the switching circuit serving to switch, in accordance with a switching signal, input to the modulation circuit such that either the first modulation command or the second modulation command is input to the modulation circuit, the control method comprising:

outputting a grid following amplitude command value and a grid following phase command value in response to receiving the switching signal instructing switching from the grid following control to the grid forming control, the grid following amplitude command value indicating a target value of an amplitude computed by the grid following control, the grid following phase command value indicating a target value of a phase computed by the grid following control; and, performing initial value adjusting processing when the grid following control is switched to the grid forming control, the initial value adjusting processing including setting an initial value of the target value of the amplitude in the grid forming control to be the grid following amplitude command value, and setting an initial value of the target value of the phase in the grid forming control to be the grid following phase command value.

10. The control method according to claim 9, wherein the initial value adjusting processing further includes performing predetermined filter processing on the grid following amplitude command value.

11. The control method according to claim 10, wherein the predetermined filter processing is processing serving as a first-order delay filter.

12. The control method according to claim 10, wherein the predetermined filter processing is processing serving as a rate limiter.

* * * * *